Nov. 11, 1969     A. RIZO-PATRON R.     3,477,540

SPEAKER SYSTEM

Filed Dec. 27, 1966     3 Sheets-Sheet 1

INVENTOR.
ALFONSO RIZO-PATRON R.

BY Byerly, Townsend, Watson & Churchill

ATTORNEYS.

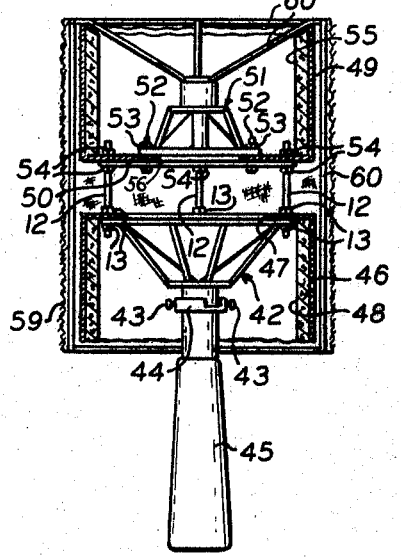
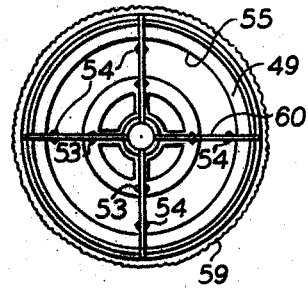
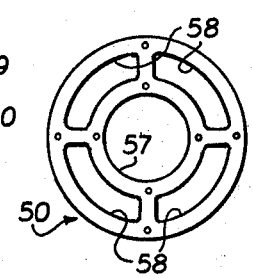
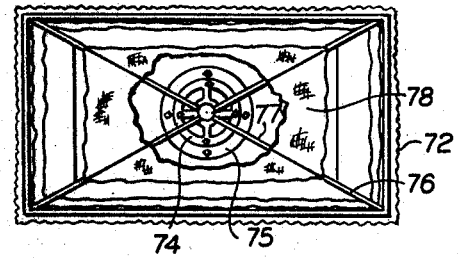
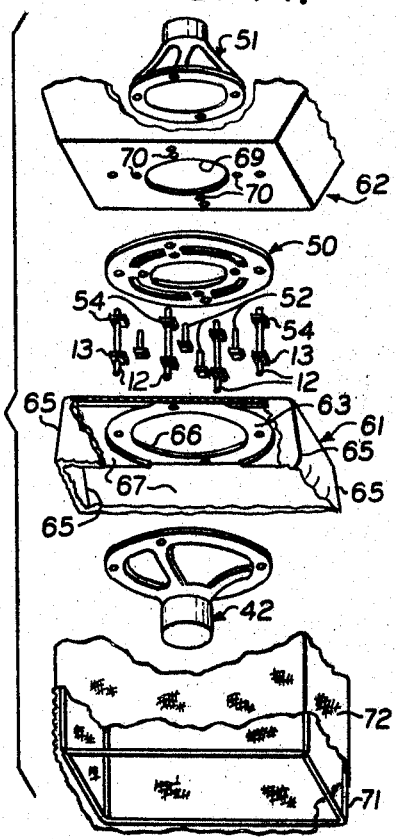
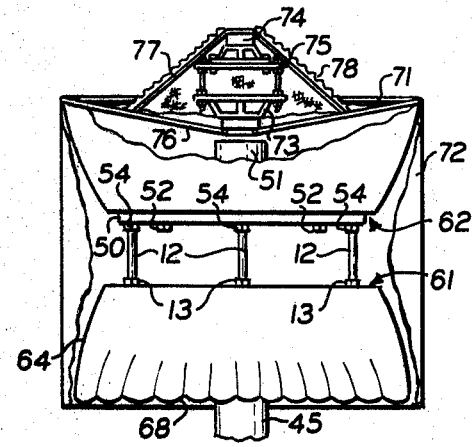

United States Patent Office 3,477,540
Patented Nov. 11, 1969

3,477,540
SPEAKER SYSTEM
Alfonso Rizo-Patron R., A. de la Torre Gonzalez 147,
San Isidro, Lima, Peru
Continuation-in-part of application Ser. No. 518,202,
Jan. 3, 1966. This application Dec. 27, 1966, Ser.
No. 609,988
Int. Cl. G10k *13/00;* H04r *7/16*
U.S. Cl. 181—31                                6 Claims

ABSTRACT OF THE DISCLOSURE

Two cone speakers are mounted coaxially face-to-face with an axial separation therebetween and in unconfined acoustic communication with the surrounding air. Each said speaker has an acoustic radiator which produces both front and rear waves of acoustic energy when excited by audio frequency signals. Said speakers when designed for the high audio frequency range do not require a baffle and their phasing is not critical. When the speakers are reproducing low audio frequencies it has been found that open baffles of a sound opaque material such as lead reproduce adequate bass or low frequency response and for such purposes the speakers should be excited 180° out of phase. The entire speaker system has been found to produce outstanding omnidirectional response. The assembly can be enclosed in acoustic cloth on a wire frame and supported so as to resemble a lamp.

---

This application is a continuation-in-part of application Ser. No. 518,202, filed Jan. 3, 1966, now abandoned.

The present invention relates to loudspeakers and more particularly to the mounting thereof and to the baffles used in conjunction therewith.

In general, an acoustic transducer or speaker is characterized by the production of both front and rear waves of acoustic energy. It is well known that such a speaker must be provided with a baffle to isolate the rear from the front waves in order to avoid cancellation of the radiant energy, particularly in the low frequency region. It is also well known that the so-called infinite baffle, if constructed so as to avoid mechanical resonance, will perform this function without introducing coloration of the sound. However, theory as well as practice dictates that the diameter of the infinite baffle be at least equal to one half the wave length of the lowest frequency it is desired to reproduce without substantial attenuation.

For high fidelity reproduction it is considered necessary or desirable to reproduce faithfully frequencies as low as 40 c.p.s. The size of the infinite baffle required, theoretically, for such reproduction is 14 feet. Rarely, is this feasible or practical even where the user of the equipment is willing to provide substantial space for the speaker system to obtain superior sound.

Similar problems are also associated with relatively small and inexpensive sound reproducing equipment. The usual low frequency limit for acceptable sound is about 100 c.p.s. It is readily apparent that an infinite baffle of the requisite size, 5½ feet, is impractical.

As a consequence, it has been necessary to compromise. In the low cost area, the usual approach is to employ small inexpensive speakers and either accept the absence of low frequencies or arrange for the cabinet or enclosure to provide a resonant cavity or actually resonate so as to produce a pseudo low frequency response. This produces the characteristic bass boominess or artificial bass.

In the better quality range, expensive speakers with heavy magnets are enclosed within various types of folded horns, reflex cabinets, sealed cabinets with acoustic suspension systems and the like in order to eliminate the cancellation phenomenon and, at the same time, to boost the low frequency response; again and always with the same type of compromise: boxed in sound.

The electrostatic speaker system represents a further attempt at solving the problem. However, it has been found necessary, heretofore, to construct it in large size to produce merely acceptable bass response. Even the largest of these appear to be weak or deficient in the bass region.

All of the speaker arrangements mentioned above suffer from the additional drawback that they are directional in their acoustic radiation pattern. Such directional quality tends to detract from the realism of reproduced sound and does not lend itself to optimum binaural or stereo reproduction.

The present invention is predicated upon a surprising discovery which enables one to obtain the desirable features of the infinite baffle, i.e., excellent transient response and freedom from resonance and coloration, while overcoming the size limitation, and to achieve, additionally, better acoustic damping, and a closer approach to the original sound with true omnidirectionality and its attendant realism. The new speaker system fills the listening space with sound in a natural realistic way not heretofore attainable. In actual listening tests, speaker systems embodying the present invention seemed to introduce a new dimension to reproduced sound and were found more satisfying and superior to any other previously heard by the listeners.

In accordance with the invention a speaker system is provided which employs two speakers each having acoustic radiator means which produces both front and rear waves of acoustic energy, the speakers being mounted coaxially with a gap therebetween, means being provided for connecting said speakers to an audio frequency signal source such that the acoustic radiator means of the two speakers move in the same direction at any given instant, and a baffle arrangement including at least an open baffle element of sound opaque material joined acoustic-tight to one of the speakers and extending therefrom and away from the other speaker, the baffle arrangement being open with the acoustic radiator means of both speakers being in acoustic communication with the space surrounding the speaker system for both front and rear waves of both acoustic radiator means.

As used herein the term "open baffle" is intended to encompass all barriers, not qualifying as enclosures, for separating the front and rear waves of the corresponding speaker without significantly altering the elastic stiffness of the speaker. It is intended as a generic expression including within its scope the "infinite baffle," the latter being reserved for those open baffles meeting the size requirements noted previously.

The invention will be better understood after reading the following detailed description of several embodiments thereof with reference to the appended drawings wherein:

FIGURE 4 is an elevational view of a still further embodiment thereof, while

FIGURE 9 is an elevational view in section showing a further modification of the invention with a different baffle structure and an external appearance similar to a household lamp;

FIGURE 10 is a top view of FIGURE 9;

FIGURE 11 is a plan view of an element forming a part of the structure of FIGURE 9;

FIGURE 12 is a fragmentary elevational view of an embodiment similar to FIGURE 9 with portions broken away;

FIGURE 13 is a top view of FIGURE 12;

FIGURE 14 is an exploded view of the elements forming a part of the structure of FIGURE 12;

Referring, now, to the drawings, the same reference numerals are used throughout to designate the same or similar parts.

Figure 1:
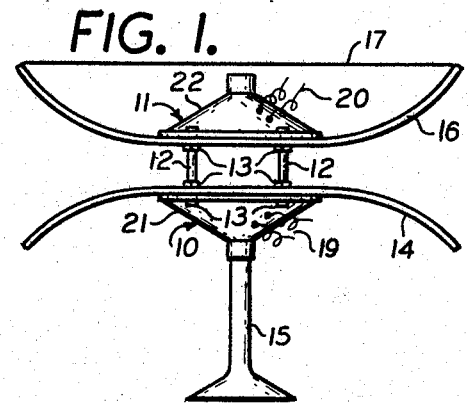
FIGURE 1 is an elevational view of a first embodiment of the invention employing sheets of sound opaque material for the baffle members.
Figure 2:
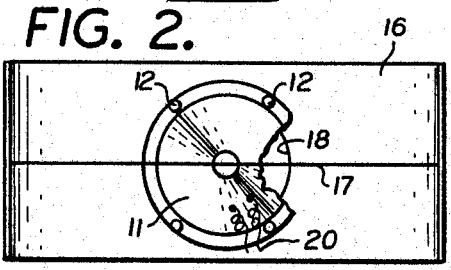
FIGURE 2 is a top view of the embodiment of FIGURE 1.

In FIGURES 1 and 2, two speakers of the cone type designated 10 and 11 are joined together face to face but with a space therebetween (i.e., an axial separation) by means of the bolts 12 and the nuts 13. Obviously, there are many other ways of joining the speakers in spaced relationship and the arrangement of nuts and bolts is intended merely to be exemplary.

The speaker 10 is provided with a baffle in the form of the rectangular sheet 14 of sound opaque material such as cork, or the like. With the arrangement supported with the common axis of the speakers vertical by means of a standard 15, the sheet 14, being of semi-flexible material, will droop of its own weight and assume a natural depending curved position, somewhat as shown.

A similar cork baffle 16 is provided for speaker 11, but a strap or other restraining member 17 is provided to impart the complementary upward curve thereto, as shown.

Conveniently, both cork sheets are provided with a central aperture such as 18, best seen in FIGURE 2, which is in registration with the corresponding speaker and the sheets are joined to the speakers at the mounting flange, all as shown.

The usual leads 19 and 20 provide means for connecting the speakers 10 and 11 to an audio frequency signal source, the phasing of the connection being made such that the acoustic radiators, here the cones 21 and 22, of the two speakers 10 and 11, move in the same direction along their common axis at any given instant. That is, as cone 21 moves upward so does cone 22 and vice versa even though the speakers are inverted relative to each other. This requires the speakers in the embodiment of FIGURE 1 to be energized electrically 180° out of phase.

In a typical example, two 10" full range speakers were mounted such that the apices of the cones were approximately 10" apart. With the particular speakers employed the spacing between the flanges was about 5". The cork sheets were ¼" thick and measured approximately 2' x 3'. When the assembly was mounted with the mid-point about 4' off the floor it was found to outperform a high quality 15" coaxial speaker in a matched 14 cubic foot corner enclosure, the latter assembly weighing and costing many times the weight and cost of the assembly constituting the invention. More significant, the subject embodiment of the invention was found to provide clean bass response without appreciable attenuation down to as low as 40 c.p.s.

Figure 3:
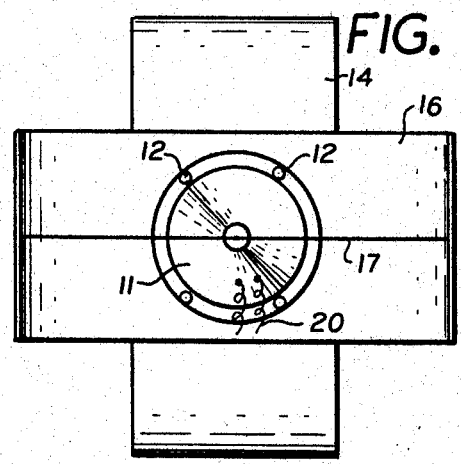
FIGURE 3 is a view similar to FIGURE 2 but showing a modification thereof.

FIGURE 3 illustrates a modification of the assembly, differing from that of FIGURES 1 and 2 only in the reorientation of the long axis of the baffle sheets 14 and 16 so as to be at right angles to each other rather than in a common plane. The sound reproduction was comparable to that of the embodiment of FIGURE 1.

Figure 4:
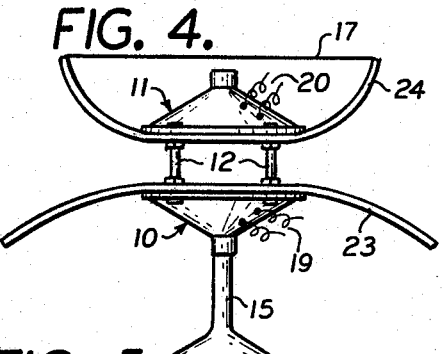
Figure 5:
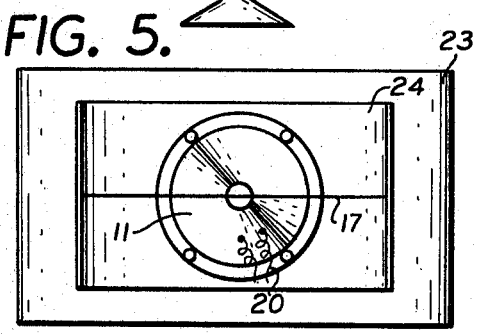
FIGURE 5 is a top view of the embodiment of FIGURE 4.

Another variation of the baffle arrangement is shown in FIGURES 4 and 5. It differs from the embodiment of FIGURES 1 and 2 in that the baffles 23 and 24 are of unequal size. For example, with the 10" speakers 10 and 11 the baffle 23 may be 3' x 4' while the baffle 24 is 2' x 3'.

Figure 6:
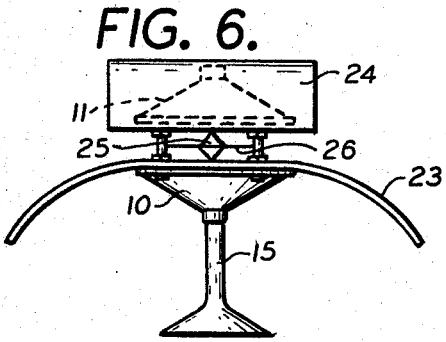
FIGURE 6 is a view similar to FIGURE 4 but showing a modification thereof.

In addition to employing baffles of unequal size, it is possible to orient them at right angles as shown in FIGURE 6.

The speaker system described above produces a sort of omnidirectional wave pattern approaching the desirable spherical form of sound propagation of the original sound which may explain the realism and three dimensional feeling of the sound thus obtained. If the assembly is relied upon for reproduction of the upper middle range of frequencies or higher, observable improvement will be experienced by supporting a conical reflector 25 on a bridge 26 between the two speakers 10 and 11, as shown in FIGURE 6. This will increase the horizontal emission from between the baffles in the middle and upper frequency range. It will be understood that a reflector of this type can be incorporated advantageously in the embodiments described with reference to FIGURES 1 to 5.

In constructing the baffles described above they may consist of more than one sheet of material stacked or laminated together. Furthermore, it is preferable that the baffles be non-circular. While a rectangular configuration has been chosen for purpose of illustration, any irregular shape will be found to be satisfactory. For aesthetic reasons, if the system is not concealed by acoustic cloth, it may be desired to provide the baffles with an ornamental contour. The exact size of the baffles does not appear to be critical. However, the optimum size will vary with the speaker employed. In general, the larger the baffle the better the bass response; but if the baffle is too large it will detract from the realism.

Figure 7:
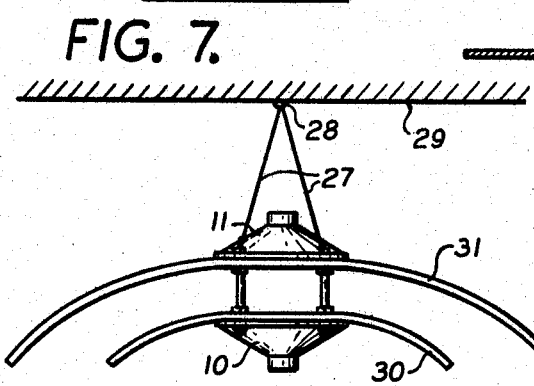
FIGURE 7 is an elevational view of still another embodiment of the invention.

If it is desired to support the system from overhead, an arrangement such as shown in FIGURE 7 can be employed. Here, by way of example, the speakers are suspended by cables 27 from an eyelet 28 in the ceiling 29. The baffles 30 and 31 are of unequal size, baffle 31 being the larger. In any known manner the baffles can be arranged to assume a depending configuration, somewhat as shown.

While the arrangement of the baffles is believed to contribute to the overall response of the system, substantial improvement is obtained from the coaxial mounting of the two speakers. This was established by listening tests with the system shown in FIGURE 8.

In one unit that was constructed a 12" woofer 32, having a frame 33 and a cone 34, was mounted face down over an opening 35 in a wood baffle or sheet 36. This, in turn, was supported by a concrete column 37 which was spaced from the floor by the legs 38. A 10" woofer 39 having a frame 40 and a cone 41 was suspended by a spider 50 (such as shown in FIGURE 11) below the opening 35 and within the column 37. The spider support left the front faces of both cones 34 and 41 in communication with the interior of column 37. The speakers 32 and 39 were energized electrically 180° out of phase so that the cones moved in the same direction along their common axis at any given instant. The concrete column was approximately 4' high and had an inside diameter of about 12" with a wall thickness about 2". The space between the bottom of the column and the floor was about 4". This system was found to produce smooth bass output down to below 40 c.p.s. If desired, the upper speaker can be concealed behind acoustic cloth supported by a frame.

While speakers of equal size have been referred to in describing the embodiments of FIGURES 1 to 7, further improvement may be had by using two speakers of different size. The combination of a 10" speaker with a 12" speaker was found very effective in the embodiment of FIGURE 6, for example.

While the embodiments of FIGURES 1 to 7 have been found to provide very good results, the cork baffles are somewhat fragile. Much more durability, considerably more flexibility and even better acoustic results are provided by the use of rubber instead of cork and especially by the structures shown in FIGURES 9 through 17.

Referring to FIGURES 9 to 11, a speaker 42 is mounted facing upward with its axis vertical and its magnet structure secured by thumb screws 43 in a socket 44 at the top of a standard or pedestal 45. A cylindrical shell 46 of lead with an aperture 47 and lined with sound absorbing material 48 is secured to the mounting flange of the speaker 42 by means of the studs 12 and nuts 13, as shown. A similar lead shell 49 is secured between the web or mounting ring 50 (best seen in FIGURE 11) and the mounting flange of a second somewhat smaller speaker 51 by means of the bolts 52 and nuts 53. The shell 49 with its associated speaker 51 and ring 50 is secured between the nuts 54 on the studs 12 axially separated from the speaker 42. A quantity of sound absorbing material 55 lines the inner surface of the shell 49. The shell 49 is provided, as shown, with an aperture 56 in register with the mouth of speaker 51. The ring 50 is similarly provided with a central aperture 57. Arcuate slots 58 may be provided in ring 50 to reduce its weight. While not shown, it is to be understood that speakers 42 and 51 are provided with means for energizing them 180° out of phase.

While not contributing to the sound reproducing capability of the system the structure just described can be effectively concealed and given an aesthetic dress by an envelope of acoustic cloth 59 supported by the wire frame 60 which, in turn, rests on the magnet of speaker 51 and on the upper edge of the shell 49.

Although it has been omitted from FIGURE 9, it may be desirable to employ a rigid flange ring on the side of shell 46 opposite the speaker 42 in order to achieve an acoustic-tight connection between the speaker and the lead shell.

The shells or baffles 46 and 49 of FIGURE 9 are substantially cylindrical in cross-section. However, further improvement is obtained by employing a polygonal configuration such as the rectangular shape shown in FIGURES 12 to 14 to which attention is now directed. As best seen in FIGURE 14, the assembly may be substantially the same as that employed in FIGURE 9 with the exception being the construction of the two baffles 61 and 62. Baffle 61 may be conveniently formed by starting with a thin rectangular sheet of lead and folding up the sides, introducing corrugations and irregularities where necessary to accommodate the excess material inherent in the geometric alteration. Slits can be made running in from the corners to facilitate folding, if preferred, so long as they are subsequently sealed by soldering or other suitable procedure. As seen in FIGURE 14 the base 63 of the bowl-like structure is rectangular. The side walls on all four sides may curve gently as seen in FIGURE 12 at 64. The corners or intersections of the side walls 65 may be arranged to follow an exponential path. Aperture 66 is provided to register with the mouth of speaker 42. Both the side walls and bottom of the lead shell of baffle 61 are lined with sound absorbing material 67. In addition to corrugating the side walls of the baffle 61 the edges may be scalloped or given an irregular profile as best seen at 68 in FIGURE 12.

It will be readily appreciated that baffle 62 is similar to baffle 61 except for the size of aperture 69, which matches smaller speaker 51, and the provision of additional bolt holes 70.

The speaker-baffle arrangement of FIGURE 14 can be mounted on pedestal 45 in the same manner as shown in FIGURE 9. As shown, in FIGURES 12 to 14, a wire frame 71 supporting acoustic cloth 72 surrounds and rests upon the upper baffle 62.

Up to this point little has been said about the sound reproducing capabilities of the embodiments of FIGURES 9 and 12. As a matter of fact, the acoustic results obtained experimentally were clearly superior to that obtained with the cork embodiments, with more bass response probably accruing from the greater sound opaqueness of lead than cork, at the expense of added weight. In a typical arrangement the embodiment of FIGURE 9 was constructed with speaker 42 of 12" and speaker 51 of 8". The approximate diameter of the baffles was 18", and the overall height of the assembly, ignoring the pedestal, was about 24". This embodiment when employed for monophonic reproduction gave best results when used in conjunction with an auxiliary speaker, e.g., an electrostatic, the latter covering the upper frequency spectrum above about 1,000 cycles.

The embodiment of FIGURE 12, however, is intended to cover the entire frequency range. In order to do so the speakers 61 and 62 may be of 15" and 10", respectively. They are used to reproduce all frequencies within their respective capabilities. In order to supplement the upper frequency range where the larger speakers fall off, there are also provided two more speakers, 73 and 74 of 5" and 3" size, respectively. Speakers 73 and 74 are mounted coaxially and face-to-face in very much the same manner as the larger speakers with the principal exception that they are not supplied with baffles. Thus, a smaller version of the ring 50 is employed at 75 in a manner that should be clearly obvious from viewing the drawings.

As best seen in FIGURES 12 and 13 the assembly of speakers 73 and 74 is supported between the wire frame members 76 and 77. An envelope of acoustic cloth 78 surrounds the members 77. Speakers 73 and 74 can be energized in phase with either speaker 42 or 51 by the usual leads, not shown.

In an actual embodiment constructed according to FIGURES 12 to 14, which provided the optimum acoustical results obtained in all the embodiments tried, the speakers 42 and 51 were axially separated over 4" and speakers 73 and 74 were separated over 2". The lead sheets used in construction of baffles 61 and 62 were $\frac{1}{16}$" thick and approximately 36" x 40" prior to folding. When the speakers and baffles were assembled they produced an overall lamp shade outline measuring approximately 18" x 24" x 20" high. By selecting an appropriate pedestal height and supporting the system on a suitable table, or the like, the speakers can be located at an optimum listening level. In a typical arrangement the speaker section was located in a zone between 44" and 64" off the floor with excellent results. However, locating the speaker section near the mid-point between floor and ceiling should be avoided.

Figure 15:
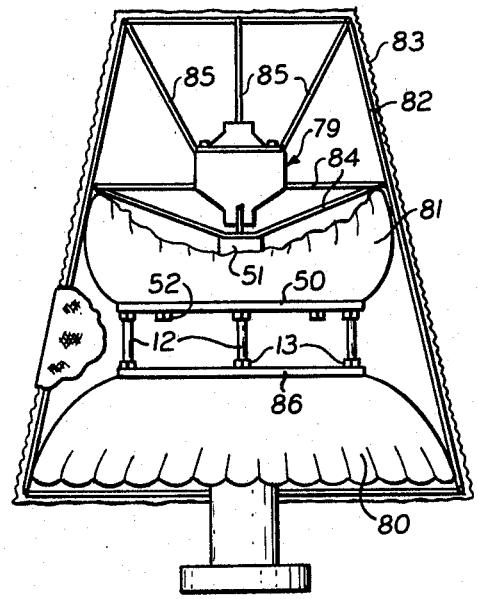
FIGURE 15 is a somewhat diagrammatic sectional view of a further modification of the structure of FIGURE 12.

The embodiments described with reference to FIGURES 9 to 14 resemble in outward appearance typical household table lamps. In FIGURE 15, there is shown a modification of the system of FIGURE 12 adapted to be supported directly by the floor of the listening room and giving the outward appearance of a floor lamp. It can be assumed that the same speaker alignment is employed in FIGURE 15 as in FIGURE 12. For simplicity the high frequency speaker assembly is shown only diagrammatically at 79. The baffles 80 and 81 have been given a different profile so as to accommodate the tapering frame 82 and acoustic cloth enclosure 83. The cross frame members 84 support the entire frame on baffle 81 while the depending frame members 85 support the speaker assembly 79. Because of the change in size and contour of baffle 80 it may be desirable to include the flange ring 86 for the purpose previously described. While not apparent from the drawings the transverse cross-section of the baffles and cloth enclosure is preferably rectangular, or at least non-circular.

Figure 16:
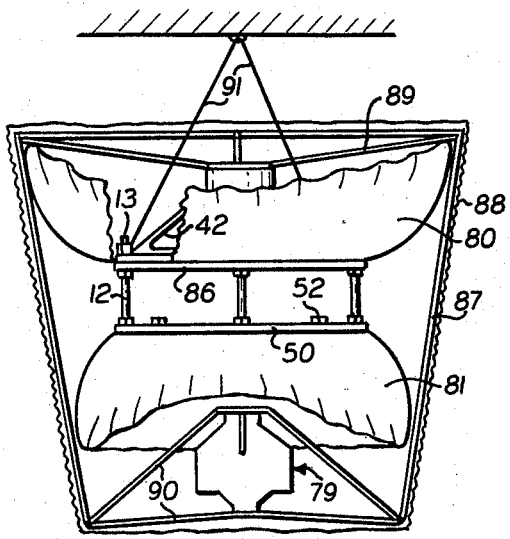
FIGURE 16 is an elevational view showing a still further modification thereof.

For ceiling mounting the embodiment of FIGURE 16 can be used. This structure is essentially an inversion of the structure of FIGURE 15 but somewhat truncated. The frame 87 for the acoustic cloth envelope 88 is supported by engagement of members 89 with baffle 80 and the magnet of speaker 42. Frame members 90 support the high frequency speakers 79. Cables or wires 91 can be joined to the flange ring of speaker 42 under the nuts 13 to suspend the structure, as shown. Naturally, the electric wiring will be introduced through a ceiling receptacle in the same manner as ceiling luminaires.

Figure 17:
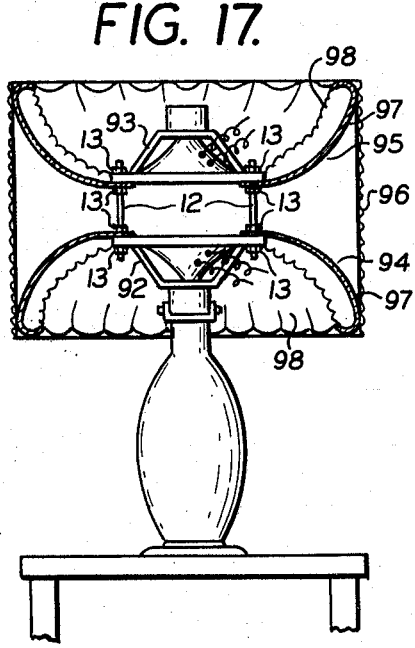
FIGURE 17 is an elevational view partly in section of a further embodiment arranged for table mounting.

In the embodiments of FIGURES 9 to 16 the baffled speakers have been described as being of unequal size. This is preferred for optimum results. However, extremely good results can be obtained with two identical speakers in a configuration as shown in FIGURE 17. As seen therein, speakers 92 and 93 with bowl-like baffles 94 and 95 are joined by the studs 12 and nuts 13, as shown. The baffles are then concealed by the acoustic cloth envelope 96 in similar fashion to the embodiments previously described. The baffles 94 and 95 can actually be identical being formed from a sheet of lead 97 and sound absorbing material 98.

The irregular sides and edges preferred for the baffles in FIGURES 9 through 17 are believed to reduce the possibility of standing waves being developed. In all of these embodiments the height of the bowl-like baffle should be substantially less than the shorter cross-sectional dimension of the baffle in the vicinity of the speaker mounting plane.

Figure 8:
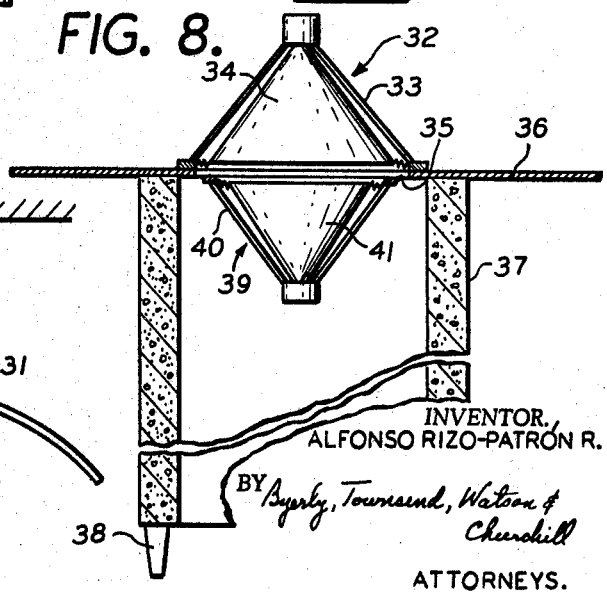
FIGURE 8 is an elevational view in section of another embodiment of the invention.

Viewing the baffles employed in all of the embodiments with the exception of FIGURES 7 and 8, it will be recognized that they consist of sound opaque material joined to the speakers at their respective mounting planes and extending laterally and in opposite axial directions so as to diverge in a direction radiating from the common axis of the speakers. In the embodiments of FIGURES 9 to 17 the baffles are, additionally, in the form of a bowl-like shell with the corresponding speaker disposed at the bottom thereof.

Obviously the embodiments of FIGURES 1 through 8 may be construed in a similar manner to the embodiments of FIGURES 9 to 17 to resemble in outward appearance household lamps of table, floor and ceiling types.

In general, it can be stated that improved acoustic damping of the low frequency speakers will be obtained through use of speakers with different resonant frequencies. From the dimensions set forth herein it will be apparent that the open baffles employed in practicing the invention are substantially smaller than those dictated by the theory of the infinite baffle, bearing in mind that the speaker systems of the present invention provide excellent response down below 40 c.p.s.

The specific example described above refer to cone type speakers. However, the mounting arrangement can be adapted to any speaker of the type which produces both front and rear waves of acoustic energy.

As used herein the expression "sound opaque" is intended to define a material which is relatively impermeable to sound and acoustically inert or non-resonant. Cork, rubber and, even better, concrete, lead and other metallic materials are typical.

Examples of sound absorbing materials are glass wool, felt, cork, acoustic Celotex, expanded polystyrene, foam rubber, and so forth. Under certain circumstances the linings of sound absorbing material may be omitted from the embodiments of FIGURES 9 to 17.

The omnidirectional speakers of the present invention have been found to provide, when used in a stereophonic system, a quality of sound which with the proper sound source closely approximates the true binaural sound attainable with earphones. A distinction is here made between conventional stereophonic reproduction and binaural reproduction. In conventional stereophonic reproduction the dual channels are obtained with microphones spaced from 6 to 10 feet apart. This sound is then channeled independently to speakers with similar spacing. The effect is to create two sources widely separated which reach the two ears of the listener over different paths and give the impression of depth or dimension to the sound.

In true binaural reproduction the two microphones are spaced the average distance between the human ears. Then each channel is fed independently to a separate earphone so that the ears of the listener are effectively brought to the original sight of the microphones and hear the sound exactly as they would have heard it at that location.

Experiments with conventional speaker systems have demonstrated that the stereophonic effect is very poor, if not lost altogether, when the source is derived from closely spaced microphones. Hence, the microphones are spaced a substantial distance apart in commercial practice. It is thus most unexpected that the speakers of the present invention can be used with remarkable effect when the sound source is of the "binaural" type, i.e., derived from closely spaced microphones.

Although it is strictly a theory, a possible explanation for the operation of the system according to the invention is that the sound waves radiated laterally from between the spaced baffles experience a shift in phase of approximately 90° and act as a "phase bridge" between the generally hemispherical 180° out of phase wave fronts emanating from the rear of the two speakers. A rough guide for determining the proper axial separation of the speakers is that the distance between the apices of the speaker cones approximates the mean diameter of the bases of the cones.

While high frequency or "tweeter" speakers have been shown and described with reference to only selected ones of the embodiments described herein, it will be understood that unbaffled "tweeter" speakers can be used in conjunction with any of the low frequency baffled embodiments. It will also be appreciated that suitable filter or cross over networks are incorporated in known manner where required to exclude low frequency signals from the high frequency or "tweeter" speakers.

The invention has been described with reference to the presently preferred embodiments thereof. It will be understood, however, by those skilled in the art to which it pertains that numerous changes may be made therein without departing from the true spirit of the invention as defined in the appended claims.

What is claimed is:

1. A speaker system for producing omnidirectional sound comprising at least one pair of cone speakers for reproducing low frequencies, which are mounted coaxially in face-to-face relationship, with an axial separation therebetween and in unconfined acoustic communication with the surounding air, said speakers being of the type having an acoustic radiator which produces both front and rear waves of acoustic energy, said pair of speakers which produce the low frequencies being connected to an audio frequency signal source so as to excite them electrically 180° out of phase to cause their acoustic radiators to move in the same direction on any given instant, said low frequency speakers each having a peripheral flange and an open baffle of sound opaque material joined acoustic-tight thereto with said baffle extending outwardly and away from said flange, said low frequency speakers being vertically supported close to a supporting surface such as a table top, floor or ceiling, and enclosed in part within an acoustic cloth whereby in outward appearance it resembles a lamp.

2. A speaker system according to claim 1 wherein the sound opaque material for said baffles is lead sheet.

3. A speaker system according to claim 1 wherein the distance between the apices of the cones approximates the mean diameter of the bases of the cones.

4. A speaker system according to claim 1 wherein the distance between the supporting surface and the nearer low frequency speaker is less than twice the distance between the apices of the cones of such low frequency speakers.

5. A speaker system according to claim 1 having at least one unbaffled speaker of high audio frequency range.

6. A speaker system according to claim 1 having a pair of high frequency unbaffled cone speakers mounted in face-to-face relationship, with an axial separation therebetween and coaxially with the pair of baffled low frequency speakers, said unbaffled high frequency speakers being disposed on the side of said low frequency speakers remote from said supporting surface.

References Cited

UNITED STATES PATENTS

| | | | |
|---|---|---|---|
| 1,759,556 | 5/1930 | Hutchison | 181—31 |
| 1,943,499 | 1/1934 | Williams | 181—27 |
| 2,969,848 | 1/1961 | Farwell | 181—31 |
| 3,054,856 | 9/1962 | Arany | 179—1 |
| 3,076,520 | 2/1963 | Farwell | 181—31 |

FOREIGN PATENTS

| | | |
|---|---|---|
| 975,222 | 10/1961 | Germany. |
| 1,079,675 | 4/1960 | Germany. |

STEPHEN J. TOMSKY, Primary Examiner